July 10, 1928.

C. K. DENMAN

AUTOMOBILE HOOD ILLUMINATION

Filed March 8, 1927

1,676,431

Clifford K. Denman
INVENTOR.

Patented July 10, 1928.

1,676,431

UNITED STATES PATENT OFFICE.

CLIFFORD K. DENMAN, OF LOS ANGELES, CALIFORNIA.

AUTOMOBILE HOOD ILLUMINATION.

Application filed March 8, 1927. Serial No. 173,679.

My invention relates to nickel-plated, cast brass housing for electric wiring, sockets, receptacles and electric lamps which is designed to extend the general curve of hood proper and to run horizontally along the top from the wind shield to top of radiator making finish with same.

It is the purpose of my invention to provide illumination for automobiles at the foremost part of same which may be seen when an automobile is in transit in a cross direction, thereby eliminating danger of a collision with other automobiles at cross road intersections.

In all other automobiles manufactured heretofore have had no provision for illumination horizontally above the top of hood.

Although I will describe only one way to form the housing and only two forms of openings cut in the sides of housing to permit the passage of light to the outside, it is also understood that various changes and modifications may be made therein without departing from the spirit of the invention, and the spirit and scope of the appended claims.

In the accompanying drawings.

Figure 1:
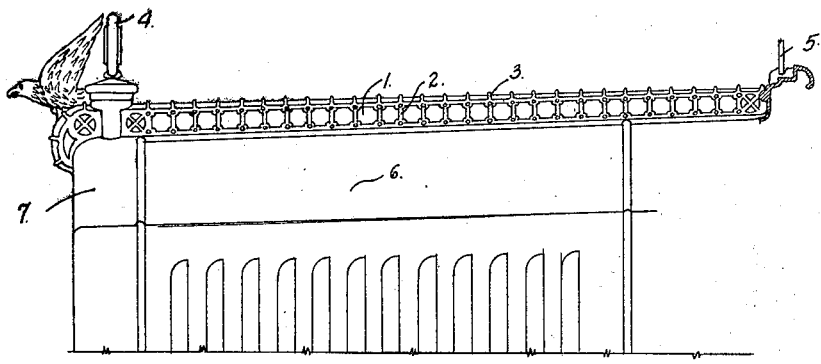
Figure 1 is a elevation or side view of part of the hood of an automobile showing the nickel-plated cast brass housing showing opening cut or cast in the sides to permit the passage of light to the outside through the colored glass glazing back of openings.

In Figure 1 of the drawing, numeral 1 shows the glazed openings in the sides of housing; numeral 2 shows the divisions between openings; numeral 3 shows ornamented ribs in top surface of housing; numeral 4 shows the motometer; numeral 5 shows the vertical glass wind shield; numeral 6 shows the curved top of hood; numeral 7 shows top of nickel-plated radiator housing; numeral 8 shows a cast brass form of the eagle which is cast or soldered to top of radiator housing.

Figure 2:
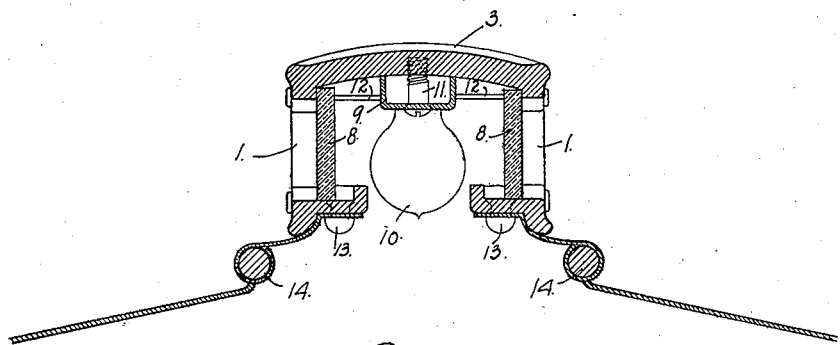
Figure 2 is a full size cross section of the housing showing the electric wiring chamber, electric lamp bulbs and glass glazing.

In Figure 2 of the drawing, numeral 1 shows the openings cut or cast in the sides of housing; numeral 3 shows curved ribs at top of housing; numeral 8 shows colored glass back of openings; numeral 9 shows metal chamber holding electric wires; numeral 10 shows electric lamp globe; numeral 11 shows screw that holds metal chamber for electric wires in positon; numeral 12 shows metal arms that hold glass 8" in position; numeral 13 shows metal rivets that anchor electric light housing to metal hood proper; numeral 14 shows round rod that forms part of hinge for side of hood.

Having thus described my invention, what I claim is:

1. In combination with the hood of a vehicle an illuminating device extending along the top thereof, said illuminating device extending along the hood and cowl from the windshield support to the radiator filler cap and terminating in an ornamental design in front of the radiator filler cap, a horizontal top plate supported above the top surface of the vehicle, side plates extending perpendicularly from the edges of the top plate to the surface of the vehicle, said side plates having ornamental openings therein and terminating at their bottom edges in flanges whereby the device is secured to the vehicle, strips of colored glass adjacent the inner sides of the side plates effectively covering the ornamental openings and lamp bulbs conventionally mounted on the under side of the top plate whereby the device is illuminated.

2. An illuminating device constructed to be mounted on the hood and cowl of a vehicle, a horizontal top plate projecting above the top surface of a vehicle, side plates extending perpendicular above the top surface of the vehicle supporting said horizontal top plate at the edges, said side plates having ornamental openings therein and terminating at their bottom edges in flanges whereby the device is anchored to the hood and cowl of the vehicle, strips of colored glass adjacent the inner sides of the side plates effectively covering the ornamental openings and lamp bulbs mounted on the under side of the top plate whereby the device is illuminated.

In testimony whereof, I have signed my name to this specification.

CLIFFORD K. DENMAN.